United States Patent
Shin et al.

(10) Patent No.: US 10,606,509 B2
(45) Date of Patent: Mar. 31, 2020

(54) DATA STORAGE DEVICE MANAGING WRITE TAG, WRITING OPERATION METHOD THEREOF, AND STORAGE SYSTEM INCLUDING THE SAME

(71) Applicant: SK hynix Inc., Gyeonggi-do (KR)

(72) Inventors: Soong Sun Shin, Gyeonggi-do (KR); Han Choi, Seoul (KR); Jin Soo Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/219,527

(22) Filed: Dec. 13, 2018

(65) Prior Publication Data

US 2020/0026460 A1 Jan. 23, 2020

(30) Foreign Application Priority Data

Jul. 17, 2018 (KR) .................. 10-2018-0082700

(51) Int. Cl.
| | |
|---|---|
| *G06F 3/00* | (2006.01) |
| *G06F 3/06* | (2006.01) |
| *G06F 12/02* | (2006.01) |
| *G06F 9/30* | (2018.01) |
| *G06F 13/16* | (2006.01) |

(52) U.S. Cl.
CPC .......... *G06F 3/0656* (2013.01); *G06F 3/0611* (2013.01); *G06F 3/0631* (2013.01); *G06F 3/0679* (2013.01); *G06F 9/30098* (2013.01); *G06F 12/0246* (2013.01); *G06F 13/1673* (2013.01); *G06F 2212/7203* (2013.01)

(58) Field of Classification Search
CPC .. G06F 3/0656; G06F 12/0246; G06F 3/0631; G06F 3/0611; G06F 3/0679; G06F 13/1673; G06F 9/30098; G06F 2212/7203
See application file for complete search history.

(56) References Cited

U.S. PATENT DOCUMENTS

| | | | | |
|---|---|---|---|---|
| 6,460,127 | B1 * | 10/2002 | Akerib | G06F 15/8023 711/128 |
| 7,953,935 | B2 * | 5/2011 | Okabayashi | G06F 12/0802 711/118 |
| 8,832,324 | B1 * | 9/2014 | Hodges | G06F 13/1642 710/5 |
| 2003/0084120 | A1 * | 5/2003 | Egli | H04L 29/06 709/218 |
| 2007/0157059 | A1 * | 7/2007 | Tsao | G01R 31/318555 714/733 |
| 2008/0059659 | A1 * | 3/2008 | Moritani | G06F 21/62 710/8 |

(Continued)

FOREIGN PATENT DOCUMENTS

| | | | |
|---|---|---|---|
| CN | 101739536 A | * | 6/2010 |
| KR | 101457802 | | 11/2014 |
| KR | 101695364 | | 1/2017 |

*Primary Examiner* — Jing-Yih Shyu
(74) *Attorney, Agent, or Firm* — IP & T Group LLP

(57) ABSTRACT

A data storage device includes a storage medium; a buffer memory configured to temporarily store data to be inputted to, or outputted from, the storage medium; and a controller configured to control data exchange with the storage medium, allocate a write tag to a write command, and change an attribute of the write tag according to a processing status of the write command.

20 Claims, 6 Drawing Sheets

(56) References Cited

U.S. PATENT DOCUMENTS

| | | | |
|---|---|---|---|
| 2010/0250829 A1* | 9/2010 | Stenfort | G06F 12/023 |
| | | | 711/103 |
| 2012/0084492 A1* | 4/2012 | Stenfort | G06F 3/0605 |
| | | | 711/103 |
| 2014/0215103 A1* | 7/2014 | Cohen | G06F 13/28 |
| | | | 710/23 |
| 2016/0018999 A1* | 1/2016 | Stenfort | G06F 3/0607 |
| | | | 711/154 |
| 2017/0177425 A1* | 6/2017 | Jei | G06F 11/076 |

\* cited by examiner

DATA STORAGE DEVICE MANAGING WRITE TAG, WRITING OPERATION METHOD THEREOF, AND STORAGE SYSTEM INCLUDING THE SAME

CROSS-REFERENCE TO RELATED APPLICATION

The present application claims priority under 35 U.S.C. § 119(a) to Korean application number 10-2018-0082700, filed on Jul. 17, 2018, in the Korean Intellectual Property Office, which is incorporated herein by reference in its entirety.

BACKGROUND

1. Technical Field

Various embodiments generally relate to a semiconductor integrated apparatus, and, more particularly, to a data storage device, an operation method thereof, and a storage system including the same.

2. Related Art

A storage device electrically connected to a host device performs a data input/output operation in response to a request from the host device. The storage device may use various storage media in order to store data.

In a data storage device, native command queuing (NCQ) has been proposed as one method for improving overhead and input/output latency of commands to be executed. The NCQ method is capable of reordering commands to be processed and obtaining high performance through the reordering.

In the NCQ method, a tag having a value of 0 to 31 may be associated with each command to be executed. That is, each command may have one of 32 statuses, and each command to be executed has a unique tag value.

However, in the NCQ method, since it is not possible to effectively manage the status of data, which has been processed in a host interface but has not been processed in the storage device, by using the tags, it is necessary to provide a management technique for this.

SUMMARY

In an embodiment, a data storage device may include: a storage medium; a buffer memory configured to temporarily store data to be inputted to, or outputted from, the storage medium; and a controller configured to control data exchange with the storage medium, allocate a write tag to a write command, and change an attribute of the write tag according to a processing status of the write command.

In an embodiment, an operation method of a data storage device including a storage medium, a buffer memory, and a controller for controlling data exchange to the storage medium, the operation method may include the steps of: allocating, by the controller, a write tag to a write command received from a host device; and changing, by the controller, an attribute of the write tag according to a processing status of the write command.

In an embodiment, a storage system may include: a host device; and a data storage device including a storage medium, a buffer memory, and a controller, wherein the controller is configured to control data exchange with the storage medium, allocate a write tag to a write command, and change an attribute of the write tag according to a processing status of the write command.

In an embodiment, a storage system may include: a host device; and a data storage device including a storage medium, a buffer memory and a controller, wherein the controller is suitable for: receiving a write command and a write data corresponding to the write command from the host device; allocating a write tag to the write command; storing the received write data in the buffer memory; providing the storage medium with the stored write data; and changing an attribute of the write tag to reflect a change in processing status of the write data.

DETAILED DESCRIPTION

A data storage device, an operation method thereof, and a storage system including the same will be described below with reference to the accompanying drawings through various embodiments. Throughout the specification, reference to "an embodiment" and the like is not necessarily to only one embodiment, and different references to any such phrase are not necessarily to the same embodiment(s).

Figure 1:
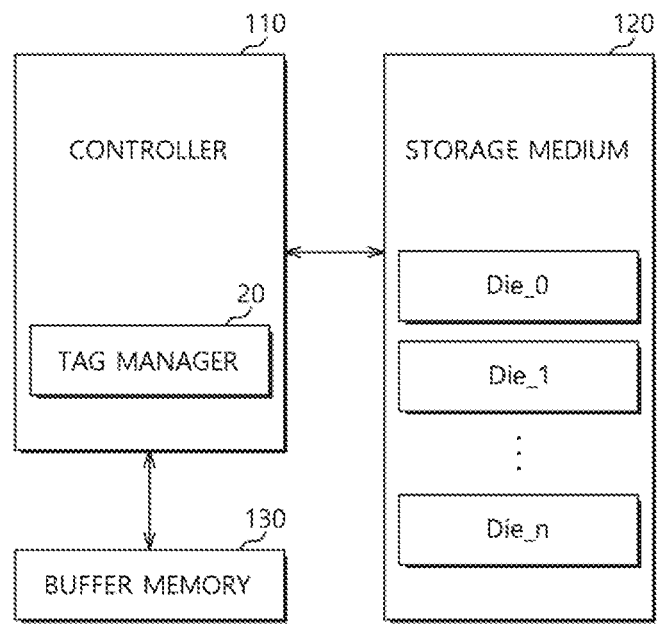
FIG. 1 is a diagram illustrating a data storage device in accordance with an embodiment.

FIG. 1 is a diagram of a data storage device 10 in accordance with an embodiment.

Referring to FIG. 1, the data storage device 10 may include a controller 110, a storage medium 120, and a buffer memory 130.

The controller 110 may control the storage medium 120 in response to a request received from a host device. For example, the controller 110 may allow data to be programmed in the storage medium 120 at a program (or write) request of the host device. Furthermore, the controller 110 may provide the data written in the storage medium 120 to the host device in response to a read request of the host device.

The storage medium 120 may write data or output the written data under the control of the controller 110. The storage medium 120 may include a volatile memory device or a nonvolatile memory device. In an embodiment, the storage medium 120 may be implemented using any of various nonvolatile memory devices such as an electrically erasable and programmable read only memory (ROM) (EEPROM), a NAND flash memory, a NOR flash memory, a phase-change random access memory (RAM) (PRAM), a resistive RAM (ReRAM or RRAM), a ferroelectric RAM (FRAM), and a spin torque transfer magnetic RAM (STT-MRAM). The storage medium 120 may include a plurality of dies Die 0 to Die n, a plurality of chips, or a plurality of packages. In addition, the storage medium 120 may include one or more single-level cells, each of which stores one bit of data and/or one or more multi-level cells, each of which stores multiple bits of data.

The buffer memory 130 serves as a space capable of temporarily storing data when the data storage device 10 performs a series of operations, such as data writing or reading, in cooperation with the host device. FIG. 1 illustrates an exemplary arrangement in which the buffer memory 130 is positioned externally to the controller 110; however, the buffer memory 130 may be disposed in the controller 110.

In an embodiment, the controller 110 may include a tag manager 20.

The tag manager 20 may be configured to manage a procedure of tagging data to be written when the data storage device 10 performs a write operation in response to a write command of the host device.

In an embodiment, when data to be written (i.e., write data) is expected to be received from the host device, the tag manager 20 may set a write tag to a first value H. When the transfer of the write data to the buffer memory 130 from the host device is completed, the tag manager 20 may set the write tag to a second value N. When the transfer of the write data to the buffer memory 130 is completed and a logical-to-physical address mapping process being performed, the tag manager 20 may set the write tag to a third value B. When the data subjected to the address mapping is completely programmed in the storage medium 120, the write tag may be set to a fourth value T. When the write operation is completed as above, the write tag for the write command may be deleted.

As described above, the tag manager 20 may set a tag on the basis of a processing status of data provided according to a write command, for example, a position of the data in the processing pipeline. One register space may be allocated to one command and various processing statuses of commands may be managed, so that it is possible to minimize resources required for write tag management. Furthermore, when an error occurs during a write operation, it is possible to check details regarding the occurrence of the error by utilizing the write tags in a debugging operation.

Figure 2:
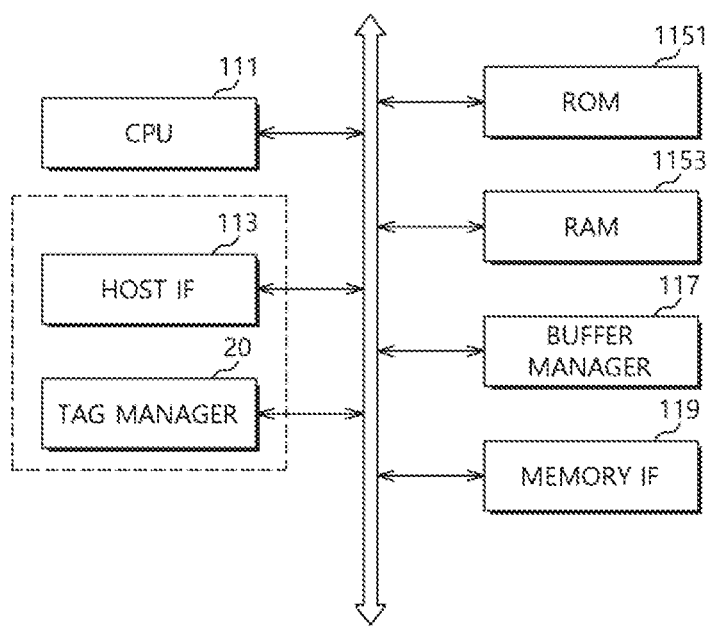
FIG. 2 is a diagram illustrating a controller in accordance with an embodiment.

FIG. 2 is a diagram illustrating a controller, e.g., the controller 110 of FIG. 1, in accordance with an embodiment.

Referring to FIG. 2, the controller 110 may include a central processing unit (CPU) 111, a host interface (IF) 113, a read only memory (ROM) 1151, a random access memory (RAM) 1153, a buffer manager 117, a memory interface (IF) 119, and the tag manager 20.

The CPU 111 may be configured to transfer various types of control information required for a data read or write operation for the storage medium 120 to the host interface 113, the RAM 1153, the buffer manager 117, and the memory interface 119. In an embodiment, the CPU 111 may operate according to firmware provided for various operations of the data storage device 10. In an embodiment, the CPU 111 may perform a function of a flash translation layer (FTL) for performing garbage collection, address mapping, wear leveling, and the like for managing the storage medium 120, and a function of detecting and correcting an error of data read from the storage medium 120.

The host interface 113 may provide a communication channel for receiving a command and a dock signal from the host device and controlling data input/output under the control of the CPU 111. Particularly, the host interface 113 may provide a physical connection between the host device and the data storage device 10. The host interface 113 may provide interfacing with the data storage device 10 in correspondence with a bus format of the host device. The bus format of the host device may include at least one of standard interface protocols such as a secure digital, a universal serial bus (USB), a multi-media card (MMC), an embedded MMC (eMMC), a personal computer memory card international association (PCMCIA), a parallel advanced technology attachment (PATA), a serial advanced technology attachment (SATA), a small computer system interface (SCSI), a serial attached SCSI (SAS), a peripheral component interconnection (PCI), a PCI express (PCI-e or PCIe), and a universal flash storage (UFS).

The ROM 1151 may store program codes required for an operation of the controller 110, for example, firmware or software, and store code data and the like used by the program codes.

The RAM 1153 may store data required for the operation of the controller 110 or data generated by the controller 110.

In a booting operation, the CPU 111 may load a boot code stored in the storage medium 120 or the ROM 1151 to the RAM 1153, thereby controlling the booting operation of the data storage device 10.

The buffer manager 117 may be configured to manage a use status of the buffer memory 130.

The memory interface 119 may provide a communication channel for signal transmission and reception between the controller 110 and the storage medium 120. The memory interface 119 may write data, which has been temporarily stored in the buffer memory 130, in the storage medium 120 under the control of the CPU 111. Furthermore, the memory interface 119 may transfer data read from the storage medium 120 to the buffer memory 130 for temporary storage.

The tag manager 20 may set a tag in a preset register space on the basis of a processing status of data provided according to a write command, for example, a position of the data. The tag manager 20 may be configured to update a tag according to a processing status of data to be written. The tag manager 20 may delete the tag when a write operation is completed.

The tag manager 20 may be disposed within the host interface 113.

Figure 3:
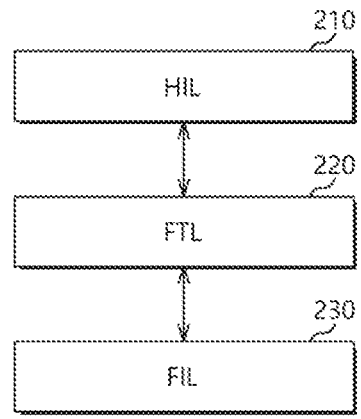
FIG. 3 is a diagram illustrating an internal operation of a controller in accordance with an embodiment.

FIG. 3 is a diagram illustrating an internal operation of a controller, e.g., the controller 110 of FIGS. 1 and 2, in accordance with an embodiment.

Referring to FIG. 3, the controller 110 may allow data exchange to be performed between the host device and the storage medium 120 through a host interface layer (HIL) 210, a flash translation layer (FTL) 220, and a flash interface layer (FIL) 230.

The HIL 210 controls the host interface 113 such that the host device and the controller 110 interface with each other.

The FTL 220 controls the controller 110 to perform garbage collection, address mapping, wear leveling, and the like for managing the storage medium 120.

The FIL 230 controls the memory interface 119 such that the controller 110 and the storage medium 120 interface with each other.

Accordingly, write data received from the host device may be transferred to the buffer memory 130 under the control of the HIL 210. The FTL 220 may decide a location in the storage medium 120 for storing the write data, map a logical address and a physical address of the write data with each other, and reflect the mapped address in a mapping table. When the mapping is completed, data temporarily stored in the buffer memory 130 may be stored in the already decided physical location of the storage medium 120 under the control of the FIL 230.

In such a data write process, the tag manager 20 is configured to change a tag attribute according to the data processing procedure.

Figure 4:
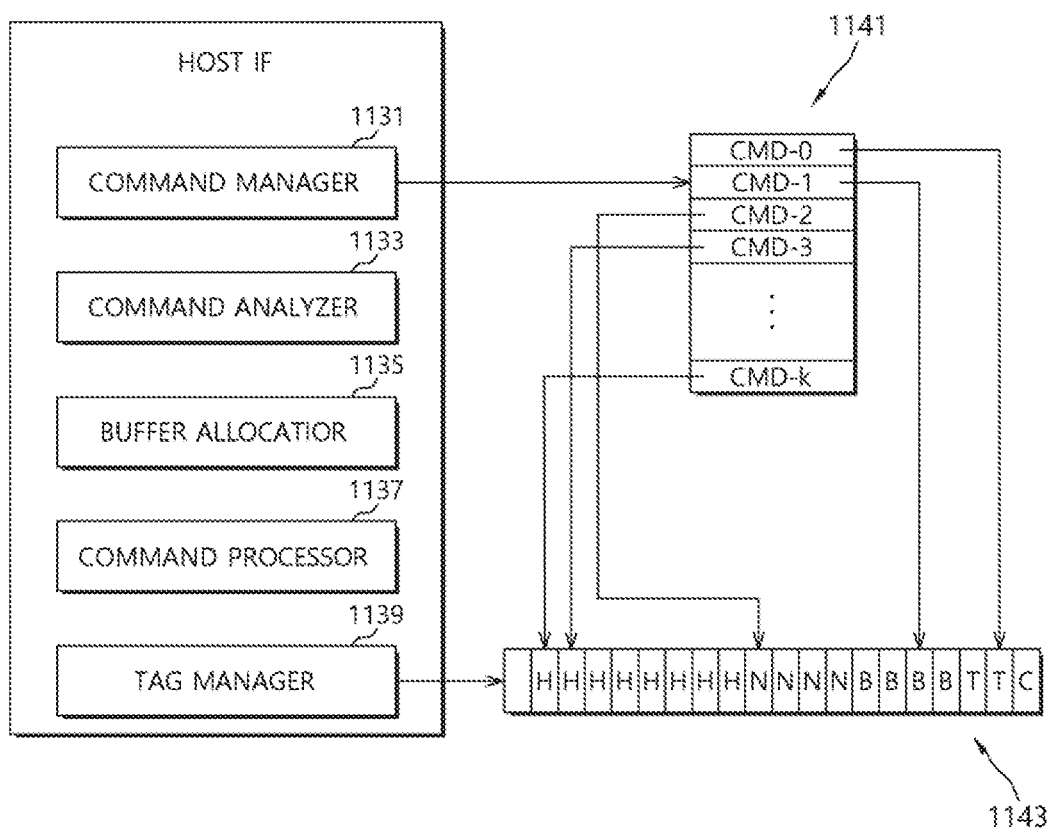
FIG. 4 is a diagram illustrating a host interface in accordance with an embodiment.

FIG. 4 is a diagram illustrating a host interface, e.g., the host interface 113 of FIG. 2, in accordance with an embodiment.

Referring to FIG. 4, the host interface (IF) 113 may include a command manager 1131, a command analyzer 1133, a buffer allocator 1135, a command processor 1137, a tag manager 1139, a command register 1141, and a tag register 1143.

The command manager 1131 may allocate an empty space of the command register 1141 and store a command received from the host device in the allocated space.

The command analyzer 1133 may parse the command received from the host device.

When the received command is a write command, the buffer allocator 1135 may allocate an empty space of the buffer memory 130 for temporarily storing write data and provide the host device with buffer allocation information. Accordingly, the host device may transmit the write data to the allocated space of the buffer memory 130.

The command and processor 1137 may process the command, which has been parsed by the command analyzer 1133, according to a set sequence.

The tag manager 1139 may be configured to manage an attribute of a write tag on the basis of the processing situation of the command processor 1137 when a write operation is performed according to the write command received from the host device. FIG. 4 illustrates an example in which the tag manager 1139 is provided inside the host interface 113. The tag manager 1139 may have the same functionality as the tag manager 20 of FIG. 1 and FIG. 2.

The write tag may be stored and managed in the tag register 1143.

In an embodiment, the tag manager 1139 may set the write tag to the first value H when write data to be written is expected to be received from the host device. When the transfer of the write data to the buffer memory 130 from the host device is completed, the tag manager 1139 may set the write tag to the second value N. When the data transfer to the buffer memory 130 is completed and a logical-to-physical address mapping process is being performed, the tag manager 1139 may set the write tag to the third value B. When the data subjected to the address mapping is completely programmed in the storage medium 120, the write tag may be set to the fourth value T. When the write operation is completed as above, the write tag for the write command may be deleted.

The write command CMD-0, CMD-1, CMD-2, CMD-3, or CMD-k received from the host device may have a unique write tag. A processing status of a corresponding write command may be checked through its write tag.

The tag is not stored in a separate register for each write processing situation and a tag attribute is changed depending on the processing situation. Thus, it is possible to minimize write tag management resources.

In an embodiment, the tag register 1143 may store a tag for each write command. Further, the tag register 1143 may store the number C of write commands being currently processed.

When the write operation is completed, the tag of the command corresponding to the completed write operation may be deleted from the tag register 1143. When a new write command is issued, a tag is allocated according to the new write command. Thus, the tag manager 1139 may update the number C of write commands being currently processed according to the number of write tags being managed by the tag register 1143.

Figure 5:
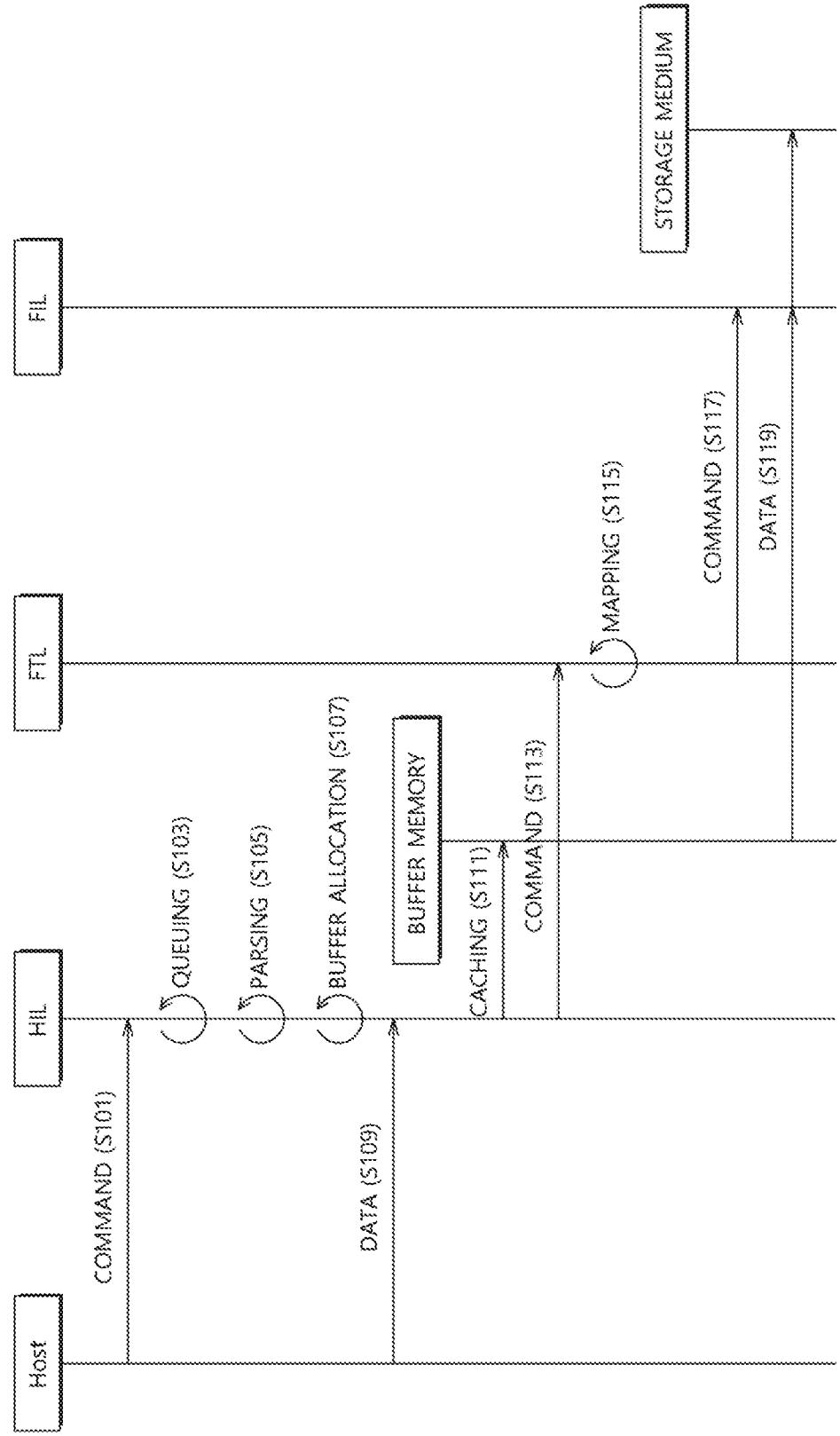
FIG. 5 is a flowchart illustrating an operation method of a data storage device in accordance with an embodiment.

FIG. 5 is a flowchart illustrating an operation method of a data storage device, e.g., the data storage device 10 of FIG. 1, in accordance with an embodiment.

Referring to FIG. 5, as a command (i.e., a write command) is transmitted from the host device and received by the controller 110 of the data storage device 10 (S101), the HIL 210 of the controller 110 may store the command in the command register 1141 (S103) and parse the command (S105).

While waiting to write data after the write command is received from the host device, the command may be assigned a write tag having the first value H indicative of an attribute or status of the command.

When the command is determined to be a write command as a result of parsing, the HIL 210 may allocate a buffer space for storing the write data (S107), and notify the host device of buffer allocation information. Even in this time, since the write data is not received from the host device, the write tag remains at the first value H.

Then, the host device may temporarily store the write data in the buffer memory 130 through the HIL 210 (S109 and S111). In other words, the HIL 210 may cache the write data from the host device in the buffer memory 130. As the write data is stored in the buffer memory 130, the attribute of the write tag may be changed to the second value N.

When the data is temporarily stored, the HIL 210 may transfer the command to the FTL 220 (S113). When the command is transferred to the FTL 220, the attribute of the write tag may be changed to the third value B. The attribute of the write tag may remain at the third value B while the command is being processed.

The FTL 220 may allocate a physical space of the storage medium 120 for storing the write data in response to the command, map a logical address and a physical address with each other, and reflect the mapped address in the mapping table (S115).

Then, the FTL 220 transfers the command to the FIL 230 (S117), so that the write data may be transferred to and stored in the storage medium 120 through the FIL 230 (S119). The attribute of the write tag may be changed to the fourth value T.

After the write data is completely programmed in the storage medium 120, the storage medium 120 may transmit a status signal indicating program completion of the write data to the controller 110. Thus, the tag of the write command may be deleted from the tag register 1143.

Figure 6:
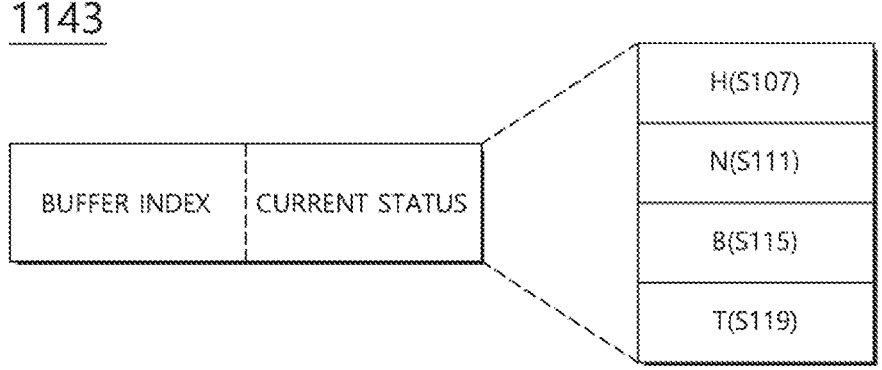
FIG. 6 is a diagram illustrating a tag register in accordance with an embodiment.

FIG. 6 is a diagram illustrating a tag register, e.g., the tag register 1143 of FIG. 4, in accordance with an embodiment.

Referring to FIG. 6, a write tag managed for each write command may be stored in the tag register 1143. Write data may be temporarily stored in the buffer memory 130 and then may be programmed in the storage medium 120, as shown in FIG. 1. Accordingly, when the current status of the write tag is managed according to an index of the buffer memory 130 (i.e., a buffer index) in which the write data has been temporarily stored, a data processing situation for each write command may be easily managed.

After the write command is received from the host device, before the write data is stored in the buffer memory 130 (i.e., at the steps S101, S103, S105, and S107 of FIG. 5), the attribute (i.e., the current status) of the write tag may have the first value H.

When the write data is stored in the buffer memory 130 (S111 of FIG. 5), the attribute of the write tag may have the second value N.

Then, until the address mapping is performed (S115 of FIG. 5), the attribute of the write tag may have the third value B.

When the write data is programmed in the storage medium 120 (S119 of FIG. 5), the attribute of the write tag may be changed to the fourth value T.

The host device may be configured to recognize that the write operation has been completed when the write data is stored in the buffer memory 130. According to embodiments of the present invention, it is possible to effectively manage data, which has been processed in the host interface 113 but has not been processed in the storage medium 120, with a tag indicating the processing status of such data, by using minimum resources.

According to embodiments of the present invention, a tag indicating a progress status of a write operation is not stored in a separate register for each progress status and a tag attribute is changed depending on the progress status. Thus, it is possible to minimize write tag management resources. Consequently, even when the data storage device receives a plurality of write requests from the host device and processes the write requests, it is possible to know the status of each command and effectively manage the overall progress of the commands by using a single tag register according to each write request.

In addition, when an error has occurred during a write operation, a tag corresponding to the write operation may be checked to determine the internal process of the data storage device in which the error has occurred, thereby improving debugging efficiency.

Figure 7:
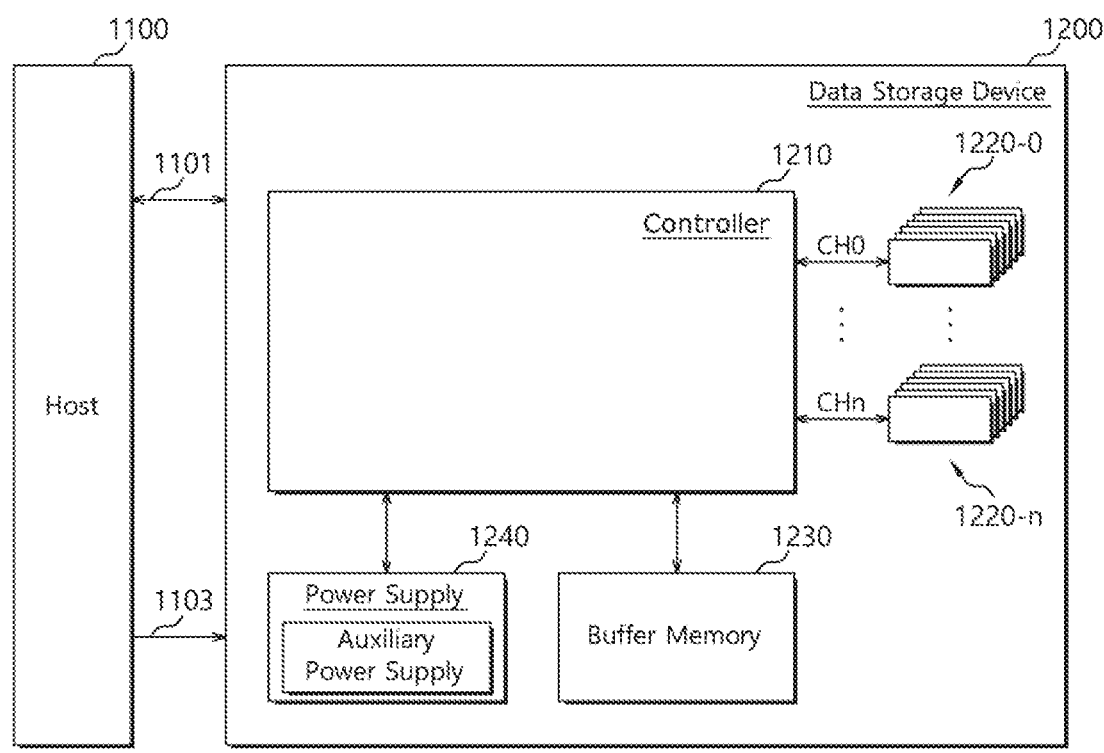
FIG. 7 is a diagram illustrating a data storage system in accordance with an embodiment.

FIG. 7 is a diagram illustrating a data storage system 1000 in accordance with an embodiment.

Referring to FIG. 7, the data storage system 1000 may include a host device 1100 and a data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface, a control component, a random access memory used as a working memory, an error correction code (ECC) component and a memory interface. In an embodiment, the controller 1210 may be implemented by the controller 110 as shown is FIGS. 1 to 4.

The host device 1100 may exchange a signal with the data storage device 1200 through the signal connector 1101. The signal may include a command, an address, data, and the like.

The controller 1210 may analyze and process the signal received from the host device 1100. The controller 1210 may control operations of internal function blocks according to a firmware or a software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH1 to CHn, respectively. One or more nonvolatile memory devices may be coupled to one channel. The nonvolatile memory devices coupled to the same channel may be coupled to the same signal bus and data bus.

The power supply 1240 may provide power inputted through the power connector 1103, to the inside of the data storage device 1200. The power supply 1240 may include an auxiliary power supply. The auxiliary power supply may supply power to allow the data storage device 1200 to be properly terminated when a sudden power-off occurs. The auxiliary power supply may include large capacity capacitors.

The signal connector 1101 may be configured by various types of connectors depending on an interface scheme between the host device 1100 and the data storage device 1200.

The power connector 1103 may be configured by various types of connectors depending on a power supply scheme of the host device 1100.

Figure 8:
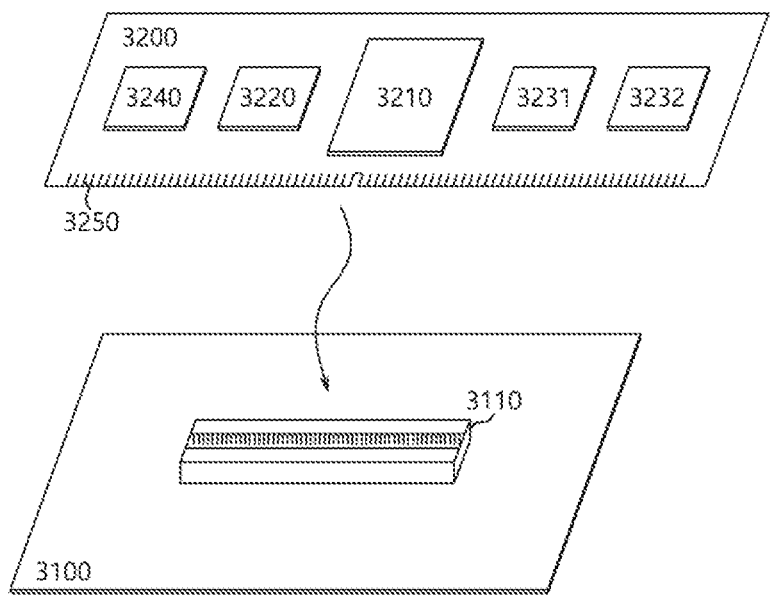
FIG. 8 and FIG. 9 are diagrams illustrating a data processing system in accordance with an embodiment.

FIG. 8 is a diagram illustrating a data processing system 3000 in accordance with an embodiment. Referring to FIG. 8, the data processing system 3000 may include a host device 3100 and a memory system 3200.

The host device 3100 may be configured in the form of a board such as a printed circuit board. Although not shown, the host device 3100 may include internal function blocks for performing the function of a host device.

The host device 3100 may include a connection terminal 3110 such as a socket, a slot or a connector. The memory system 3200 may be mounted to the connection terminal 3110.

The memory system 3200 may be configured in the form of a board such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be implemented in the same manner as the controller 110 shown in FIGS. 1 to 4.

The buffer memory device 3220 may temporarily store data to be stored in the nonvolatile memory devices 3231 and 3232. Further, the buffer memory device 3220 may temporarily store the data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250, to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data and so forth and power may be transferred between the host device 3100 and the memory system 3200. The connection terminal 3250 may be configured into various types depending on an interface scheme between the host device 3100 and the memory system 3200. The connection terminal 3250 may be disposed on any one side of the memory system 3200.

Figure 9:
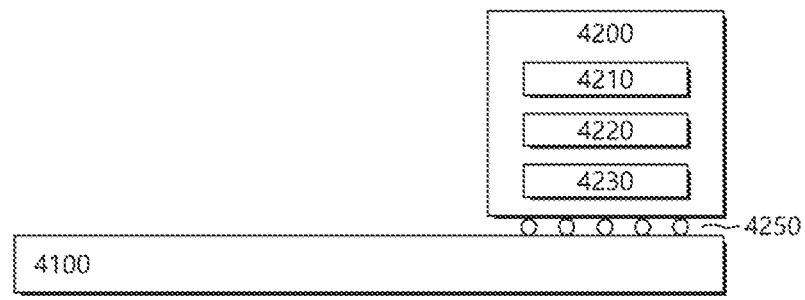

FIG. 9 is a diagram illustrating a data processing system 4000 in accordance with an embodiment. Referring to FIG. 9, the data processing system 4000 may include a host device 4100 and a memory system 4200.

The host device 4100 may be configured in the form of a board such as a printed circuit board. Although not shown, the host device 4100 may include internal function blocks for performing the function of a host device.

The memory system 4200 may be configured in the form of a surface-mounting type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be implemented in the same manner as the controller 110 shown in FIGS. 1 to 4.

The buffer memory device 4220 may temporarily store data to be stored in the nonvolatile memory device 4230. Further, the buffer memory device 4220 may temporarily store the data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 10:
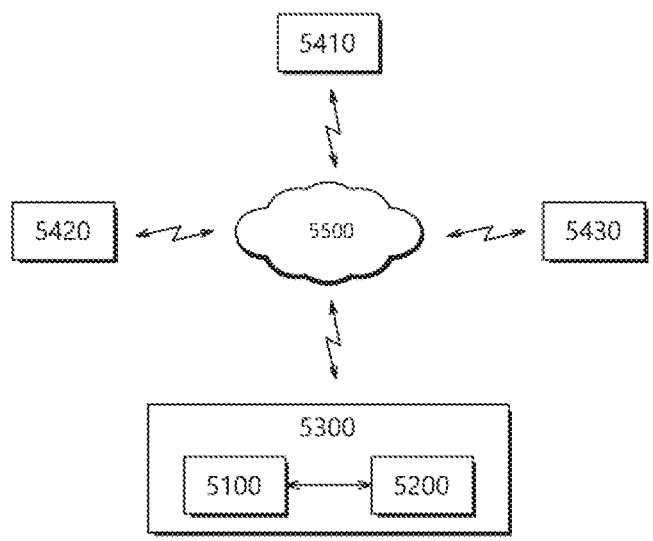
FIG. 10 is a diagram illustrating a network system including a data storage device in accordance with an embodiment.

FIG. 10 is a diagram illustrating a network system 5000 including a data storage device in accordance with an embodiment. Referring to FIG. 10, the network system 5000 may include a server system 5300 and a plurality of client systems 5410 to 5430 which are coupled through a network 5500.

The server system 5300 may service data in response to requests from the plurality of client systems 5410 to 5430. For example, the server system 5300 may store the data provided from the plurality of client systems 5410 to 5430. For another example, the server system 5300 may provide data to the plurality of client systems 5410 to 5430.

The server system 5300 may include a host device 5100 and the memory system 5200. The memory system 5200 may be implemented by the memory system 10 shown in FIG. 1, the data storage device 1200 shown in FIG. 7, the memory system 3200 shown in FIG. 8 or the memory system 4200 shown in FIG. 9.

Figure 11:
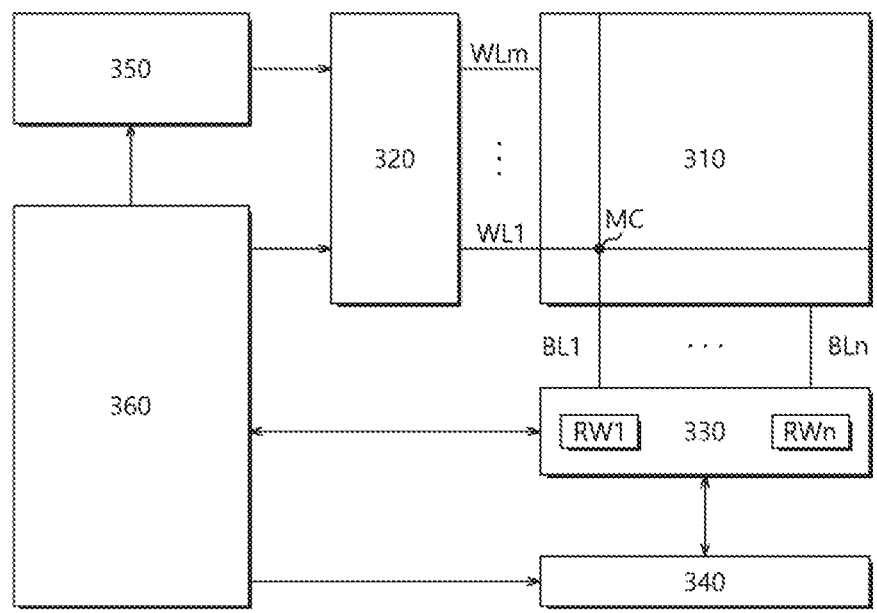
FIG. 11 is a block diagram illustrating a nonvolatile memory device included in a data storage device in accordance with an embodiment.

FIG. 11 is a block diagram illustrating a nonvolatile memory device 300 included in a data storage device in accordance with an embodiment. Referring to FIG. 11, the nonvolatile memory device 300 may include a memory cell array 310, a row decoder 320, a data read/write block 330, a column decoder 340, a voltage generator 350, and control logic 360.

The memory cell array 310 may include memory cells MC which are arranged at areas where word lines WL1 to WLm and bit lines BL1 to BLn intersect with each other.

The memory cell array 310 may comprise a three-dimensional (3D) memory array. The three-dimensional memory array has a direction extending perpendicular to the flat surface of a semiconductor substrate. Moreover, the three-dimensional memory array is a structure including NAND strings in which at least one memory cell is located in a vertical upper portion of another memory cell.

However, the structure of the three-dimensional memory array is not limited to the above-described arrangement. More generally, the 3D memory array structure can be formed in a highly integrated manner with horizontal directionality as well as vertical directionality.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While various embodiments have been illustrated and described, it will be understood to those skilled in the art in light of the present disclosure that the embodiments described are examples to which various modifications may be made within the scope of the present invention. Accordingly, the data storage device, the operating method thereof, and the storage system including the same disclosed herein should not be limited based on the described embodiments. Rather, the present invention encompasses all variations and modifications that fall within the scope of the claims.

What is claimed is:

1. A data storage device comprising:
   a storage medium;
   a buffer memory configured to temporarily store data to be inputted to, or outputted from, the storage medium; and
   a controller configured to control data exchange with the storage medium, allocate one register to each write command, store a write tag in the register allocated for each write command, and change an attribute of the write tag stored in the register based on a processing status of write data according to the write command,
   wherein the processing status of write data is configured to have any one of a status before being stored in the buffer memory, a status transferred completely in the buffer memory, a status waiting in the buffer memory, and a status stored in the storage medium.

2. The data storage device according to claim 1, wherein the controller is configured to set the attribute of the write tag to: a first value while the write data is expected to be stored in the buffer memory, a second value when the write data is transferred completely in the buffer memory, a third value while address mapping for the waiting write data is being performed, and a fourth value when the write data is programmed in the storage medium.

3. The data storage device according to claim 2, wherein, when the write data is completely programmed in the storage medium and the storage medium notifies the controller of program completion, the controller deletes the write tag corresponding to the write command for which the program completion has been notified.

4. The data storage device according to claim 1, wherein the controller comprises:
   a command register configured to store the write command, which has been received from a host device; and
   a tag register configured to store the write tag allocated to the write command.

5. The data storage device according to claim 4, wherein the tag register is configured to store index information of the buffer memory, in which the write data is temporarily stored, together with the write tag.

6. The data storage device according to claim 5, wherein the tag register is configured to further store a number of write commands being processed.

7. The data storage device according to claim 1, wherein the controller is configured to change the attribute of the write tag based on a processing position of the write data according to the write command.

8. A method of operating a data storage device including a storage medium, a buffer memory, and a controller for controlling data exchange with the storage medium, the method comprising:
   allocating, by the controller, one register to each write command to store a write tag to a write command received from a host device; and
   changing, by the controller, an attribute of the write tag stored in the register based on a processing status of write data according to the write command,
   wherein the processing status of write data is configured to have any one of a status before being stored in the buffer memory, a status transferred completely in the buffer memory, a status waiting in the buffer memory, and a status stored in the storage medium.

9. The method according to claim 8, wherein the changing of the attribute of the write tag comprises:
   setting the attribute of the write tag to a first value while the write data is expected to be stored in the buffer memory;
   setting the attribute of the write tag to a second value when the write data is stored in the buffer memory;
   setting the attribute of the write tag to a third value while address mapping for the write data is being performed; and
   setting the attribute of the write tag to a fourth value when the write data is programmed in the storage medium.

10. The method according to claim 9, further comprising:
    notifying, by the storage medium, the controller of program completion when the write data is completely programmed in the storage medium; and
    deleting, by the controller, the write tag corresponding to the write command for which the program completion has been notified.

11. The method according to claim 8, wherein the allocating of the write tag comprises:
    storing index information of the buffer memory, in which the write data is temporarily stored, together with the write tag.

12. The method according to claim 8, wherein the attribute of the write tag is changed based on a processing position of the write data according to the write command.

13. A storage system comprising:
    a host device; and
    a data storage device including a storage medium, a buffer memory, and a controller,
    wherein the controller is configured to control data exchange with the storage medium, allocate one register to each write command, store a write tag in the register allocated for each write command, and change an attribute of the write tag stored in the register based on a processing status of write data according to the write command,
    wherein the processing status of write data is configured to have any one of a status before being stored in the buffer memory, a status transferred completely in the buffer memory, a status waiting in the buffer memory, and a status stored in the storage medium.

14. The storage system according to claim 13, wherein the controller is configured to set the attribute of the write tag to: a first value while the write data is expected to be stored in the buffer memory, a second value when the write data is stored in the buffer memory, a third value while address mapping for the write data is being performed, and a fourth value when the write data is programmed in the storage medium.

15. The storage system according to claim 14, wherein, when the write data is completely programmed in the storage medium and the storage medium notifies the controller of program completion, the controller deletes the write tag corresponding to the write command for which the program completion has been notified.

16. The storage system according to claim 13, wherein the controller comprises:

a command register configured to store the write command, which has been received from a host device; and
a tag register configured to store the write tag allocated to the write command.

17. The storage system according to claim 16, wherein the tag register is configured to store index information of the buffer memory, in which the write data is temporarily stored, together with the write tag.

18. The storage system according to claim 17, wherein the tag register is configured to further store a number of write commands being processed.

19. The storage system according to claim 13, wherein the attribute of the write tag is changed based on a processing status of the write data according to the write command.

20. A storage system comprising:
a host device; and
a data storage device including a storage medium, a buffer memory and a controller,
wherein the controller is suitable for:
receiving a write command and a write data corresponding to the write command from the host device;
allocating one register to each write command, store a write tag to the write command;
storing the received write data in the buffer memory;
providing the storage medium with the stored write data; and
changing an attribute of the write tag stored in the register to reflect a change in processing status of the write data according to the write command,
wherein the processing status of write data is configured to have any one of a status before being stored in the buffer memory, a status transferred completely in the buffer memory, a status waiting in the buffer memory, and a status stored in the storage medium.

* * * * *